(12) United States Patent  
Costa (10) Patent No.: US 9,316,830 B1  
(45) Date of Patent: Apr. 19, 2016

(54) USER INTERFACE

(71) Applicant: Google Inc., Mountain View, CA (US)

(72) Inventor: Antonio Bernardo Monteiro Costa, San Francisco, CA (US)

(73) Assignee: Google Inc., Mountain View, CA (US)

( * ) Notice: Subject to any disclaimer, the term of this patent is extended or adjusted under 35 U.S.C. 154(b) by 652 days.

(21) Appl. No.: 13/629,858

(22) Filed: Sep. 28, 2012

(51) Int. Cl.  
*G09G 5/00* (2006.01)  
*G02B 27/01* (2006.01)

(52) U.S. Cl.  
CPC .................... *G02B 27/017* (2013.01)

(58) Field of Classification Search  
CPC ................ G02B 2027/0138; G02B 27/017  
USPC ........................................................... 345/8  
See application file for complete search history.

(56) References Cited

U.S. PATENT DOCUMENTS

| | | | |
|---|---|---|---|
| 7,710,395 B2 | 5/2010 | Rodgers et al. | |
| 7,885,692 B2 | 2/2011 | Cascone | |
| 8,020,989 B2 | 9/2011 | Jannard et al. | |
| 8,199,126 B1 | 6/2012 | Taubman | |
| 8,203,502 B1 | 6/2012 | Chi et al. | |
| 8,217,856 B1 | 7/2012 | Petrou | |
| 8,223,024 B1 | 7/2012 | Petrou | |
| 8,223,088 B1 | 7/2012 | Gomez et al. | |
| 2003/0014212 A1 | 1/2003 | Ralston et al. | |
| 2008/0130910 A1* | 6/2008 | Jobling et al. | 381/74 |
| 2009/0179789 A1 | 7/2009 | Haughay, Jr. et al. | |
| 2011/0194029 A1* | 8/2011 | Herrmann et al. | 348/569 |
| 2011/0221669 A1 | 9/2011 | Shams et al. | |
| 2012/0062445 A1 | 3/2012 | Haddick et al. | |
| 2012/0068914 A1 | 3/2012 | Jacobsen et al. | |
| 2012/0075177 A1 | 3/2012 | Jacobsen et al. | |

\* cited by examiner

*Primary Examiner* — Nicholas Lee  
(74) *Attorney, Agent, or Firm* — McDonnell Boehnen Hulbert & Berghoff LLP (57) ABSTRACT

Methods and systems for triggering functions on a head-mountable device are provided. A head-mountable device may receive an indication of a gesture associated with the device. In response to an indication that the gesture is a forward gesture, the head-mountable device may activate visual type functions, and in response to an indication that the gesture is a rearward gesture, the head-mountable device may activate audio type functions.

22 Claims, 6 Drawing Sheets

USER INTERFACE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called a head-mountable device or a "head-mounted display". A head-mountable device places a graphic display or displays close to one or both eyes of a wearer. To generate the images on a display, a computer processing system may be used, and an input mechanism may allow a wearer to input commands or queries. Such displays may occupy a wearer's entire field of view, or only occupy part of wearer's field of view. Further, head-mountable devices may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In a first aspect, a method is provided. The method includes receiving an indication of a gesture associated with a head-mountable device (HMD). The method further includes executing instructions to activate visual type functions on the HMD in response to an indication that the gesture is a forward gesture, and activating audio type functions on the HMD in response to receiving an indication that the gesture is a rearward gesture. The forward gesture comprises a movement in a direction toward a lens element of the HMD, and the rearward gesture comprises a movement in a direction toward an end of a side-arm of the HMD.

In a second aspect, an article of manufacture including tangible computer-readable media having computer-readable instructions encoded thereon is provided. The instructions comprise receiving an indication of a gesture associated with an HMD. The instructions further comprise activating visual type functions on the HMD in response to receiving an indication that the gesture is a forward gesture, and activating audio type functions on the HMD in response to an indication that the gesture is a rearward gesture.

In a third aspect, a system is provided. The system includes a processor, an HMD comprising a heads-up display, data storage, and machine language instructions stored on the data storage executable by the processor to perform functions including receiving an indication of a gesture associated with the HMD. The machine language instructions are further executable to perform functions comprising activating visual type functions on the HMD in response to receiving an indication that the gesture is a forward gesture, and activating audio type functions on the HMD in response to receiving an indication that the gesture is a rearward gesture.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

Disclosed is an input mechanism providing intuitive means to trigger types or classes of functions. The input mechanism may be provided by, for example, a wearable computing system or a head-mountable device (HMD).

The input mechanism may provide, for instance, means for a wearer of the head-mountable device to interact with the device.

The input mechanism may include a touch pad. In one example embodiment where the input mechanism is provided on a head-mountable device, the head-mountable device may be configured to detect an input command via the input mechanism. In response to detecting the input command, the computing device may be configured to cause a function or functions to be activated. The input commands may include graphical movements. The graphical movements may be movements that are intuitively associated with a category or class of functions a wearer wants to activate. For example, an input command to activate audio functions may include a graphical movement including a swipe on or near the head-mountable device from the direction of a wearer's eye to the wearer's ear. In another example, an input command to activate visual functions may include a graphical movement including a swipe on or near the head-mountable device from the direction of a wearer's ear to the wearer's eye.

An example wearable computing device is further described below in connection with FIGS. 1A-2. An example implementation of an example input mechanism on a wearable computing device is further described below in connection with FIGS. 3A-3B. An example method is described below in connection with FIG. 4.

II. Exemplary Wearable Computing Devices

Systems and devices in which exemplary embodiments may be implemented will now be described in greater detail. In general, an exemplary system may be implemented in or may take the form of a wearable computer. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary, system may also take the form of a device such as a wearable computer or mobile phone, or a subsystem of such a device, which includes such a non-transitory computer readable medium having such program instructions stored thereon.

Figure 1A:
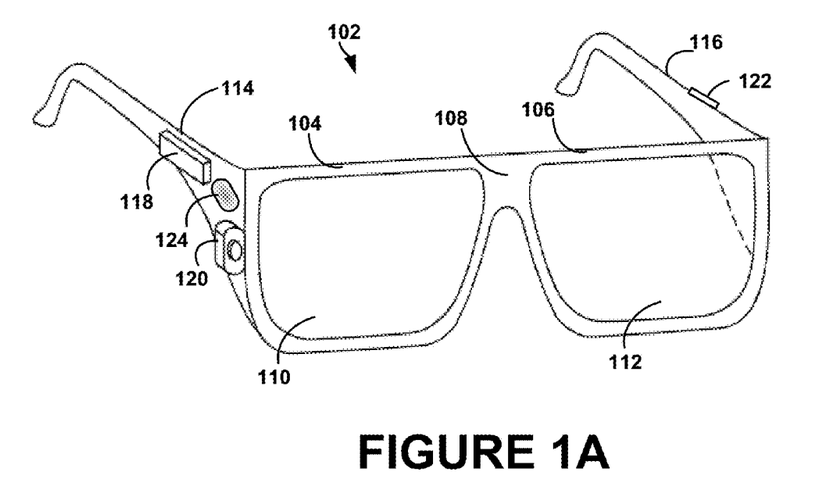
FIG. 1A illustrates a wearable computing system according to an exemplary embodiment.

FIG. 1A illustrates a wearable computing system according to an exemplary embodiment. In FIG. 1A, the wearable computing system takes the form of a head-mountable device (HMD) 102 (which may also be referred to as a head-mounted display). It should be understood, however, that exemplary systems and devices may take the form of or be implemented within or in association with other types of devices, without departing from the scope of the invention. Further, unless specifically noted, it will be understood that the systems, devices, and methods disclosed herein are not functionally limited by whether or not the head-mountable device 102 is being worn. As illustrated in FIG. 1A, the head-mountable device 102 comprises frame elements including lens-frames 104, 106 and a center frame support 108, lens elements 110, 112, and extending side-arms 114, 116. The center frame support 108 and the extending side-arms 114, 116 are configured to secure the head-mountable device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mountable device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mountable device 102 to the user. The extending side-arms 114, 116 may further secure the head-mountable device 102 to the user by extending around a rear portion of the user's head. Additionally or alternatively, for example, the HMD 102 may connect to or be affixed within a head-mountable helmet structure. Other possibilities exist as well.

The HMD 102 may also include an on-board computing system 118, a video camera 120, a sensor 122, and a finger-operable touch pad 124. The on-board computing system 118 is shown to be positioned on the extending side-arm 114 of the head-mountable device 102; however, the on-board computing system 118 may be provided on other parts of the head-mountable device 102 or may be positioned remote from the head-mountable device 102 (e.g., the on-board computing system 118 could be wire- or wirelessly-connected to the head-mountable device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mountable device 102; however, the video camera 120 may be provided on other parts of the head-mountable device 102. The video camera 120 may be configured to capture images at various resolutions or at different frame rates. Many video cameras with a small form-factor, such as those used in cell phones or webcams, for example, may be incorporated into an example of the HMD 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mountable device 102; however, the sensor 122 may be positioned on other parts of the head-mountable device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mountable device 102. However, the finger-operable touch pad 124 may be positioned on other parts of the head-mountable device 102. Also, more than one finger-operable touch pad may be present on the head-mountable device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
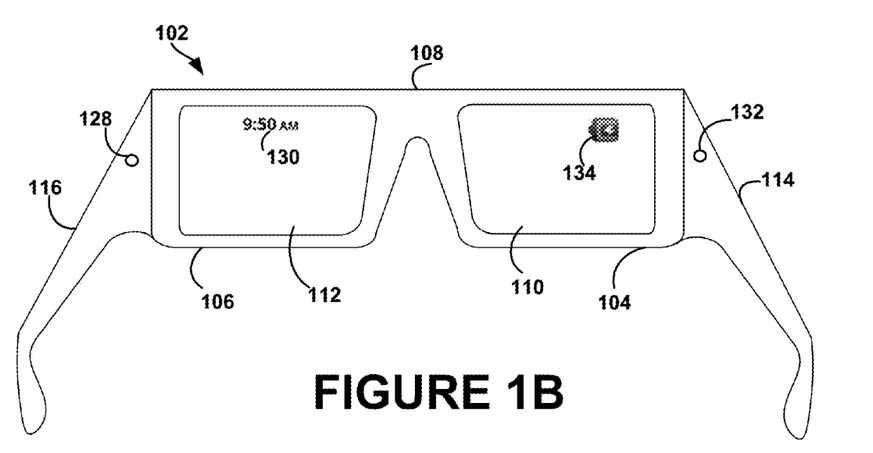
FIG. 1B illustrates an alternate view of the wearable computing device illustrated in FIG. 1A.

FIG. 1B illustrates an alternate view of the wearable computing system illustrated in FIG. 1A. As shown in FIG. 1B, the lens elements 110, 112 may act as display elements. The head-mountable device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
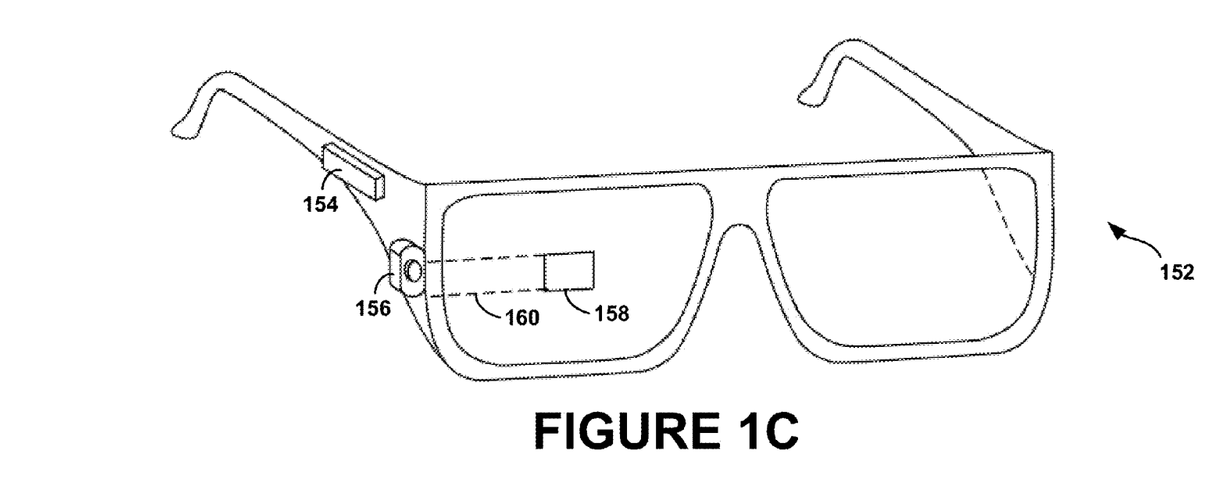
FIG. 1C illustrates another wearable computing system according to an exemplary embodiment.

FIG. 1C illustrates another wearable computing system according to an exemplary embodiment, which takes the form of an HMD 152. The HMD 152 may include frame elements and side-arms such as those described with respect to FIGS. 1A and 1B. The HMD 152 may additionally include an on-board computing system 154 and a video camera 156, such as those described with respect to FIGS. 1A and 1B. The video camera 156 is shown mounted on a frame of the HMD 152. However, the video camera 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

Figure 1D:
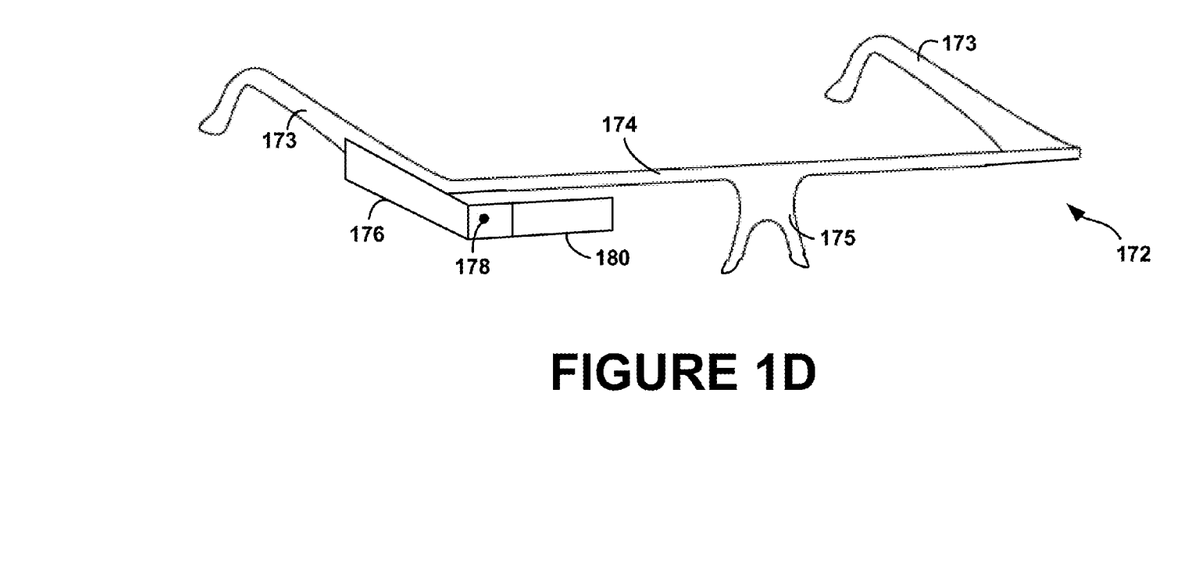
FIG. 1D illustrates another wearable computing system according to an exemplary embodiment.

FIG. 1D illustrates another wearable computing system according to an exemplary embodiment, which takes the form of an HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include an on-board computing system 176 and a video camera 178, such as those described with respect to FIGS. 1A and 1B.

The HMD 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the user's view of the physical world. In one example, the single lens element 180 may be coupled to the inner side (i.e., the side exposed to a portion of a user's head when worn by the user) of the extending side-arm 173. The single lens element 180 may be positioned in front of or proximate to a user's eye when the HMD 172 is worn by a user. For example, the single lens element 180 may be positioned below the center frame support 174, as shown in FIG. 1D.

Figure 2:
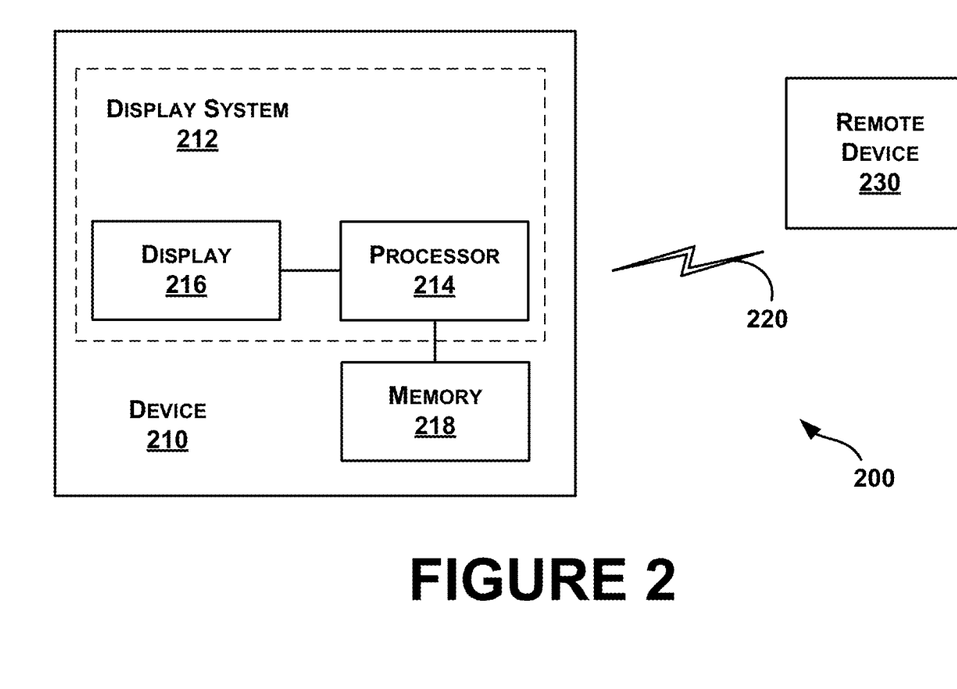
FIG. 2 illustrates a schematic drawing of a computing device according to an exemplary embodiment.

FIG. 2 illustrates a schematic drawing of a computing device according to an exemplary embodiment. In system 200, a device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mountable devices 102, 152, or 172 described with reference to FIGS. 1A-1D.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. Example Implementation

Figure 3A:
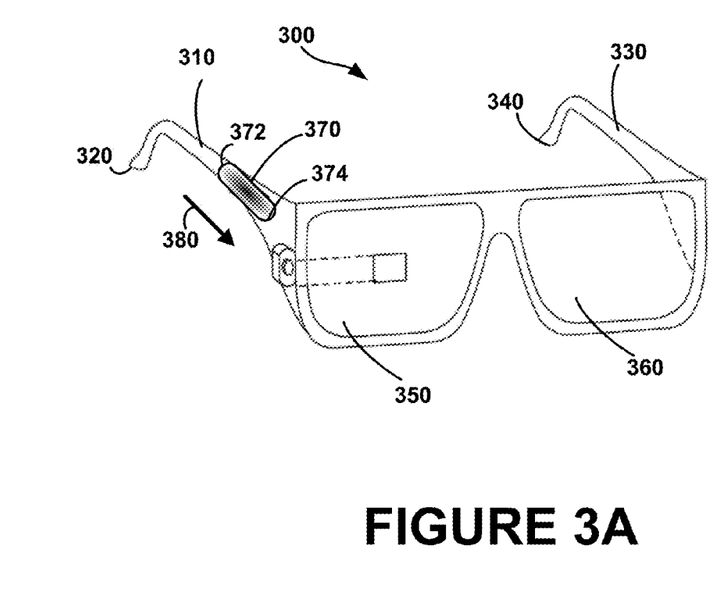
FIG. 3A illustrates another wearable computing system including a touch pad that serves as an input for triggering functions of the wearable computing system, according to an exemplary embodiment.

FIG. 3A illustrates another wearable computing system including a touch pad that serves as an input for triggering types of functions of the wearable computing system, according to an exemplary embodiment. In FIG. 3A, the wearable computing system takes the form of a head-mountable device (HMD) 300. The HMD 300 may be the same or similar to the HMDs 102, 152, and 172 described with reference to FIGS. 1A-1D. The HMD 300 comprises a first extending side-arm 310 with a first end 320, a second extending side-arm 330 with a second end 340, a first lens element 350 and a second lens element 360.

In the example illustrated in FIG. 3A, an input mechanism in the form of a touch pad 370 is located on the first extending side-arm 310 of the HMD 300. In other example embodiments, the touch pad 370 may be located on the second extending side-arm 330 or another location on the HMD 300. The touch pad 370 may be a touch pad as described with reference to FIG. 1A. The touch pad 370 includes a first end 372 and a second end 374. When the HMD 300 is worn by a wearer, the first end 372 of the touch pad 370 may be located near the wearer's ear, and the second end 374 of the touch pad 370 may be located near the first lens element 350 which may be placed over the wearer's eye. In other example embodiments, the touch pad 370 may be located in various other locations along the extending side-arm 310 and may comprise a more compact or elongated size than that shown in FIGS. 3A-3B.

FIG. 3A illustrates a direction of a forward gesture, shown by arrow 380, that may be made on the touch pad 370. The forward gesture 380 may comprise an input on the touch pad 370, such as by a finger or a stylus. The forward gesture 380 may begin with an applied pressure input near the first end 372 of the touch pad 370 and may comprise a swipe in the direction toward the second end 374 of the touch pad 370. Thus, the forward gesture 380 may comprise a motion from near the wearer's ear and moves toward the wearer's eye when the HMD 300 is worn.

The HMD 300 may receive an indication that the forward gesture 380 has been input on the touch pad 370. The touch pad 370 may detect the gesture and send an indication of the gesture to a processor on the HMD 300, for example. In response to receiving the indication of the forward gesture 380, the HMD 300 may be configured to execute instructions to activate certain functions of the HMD 300, for example, visual type functions. Examples of visual type functions are recording or reviewing photographs, bursts, panoramas, videos including short animations or short video sequences, performing a visual search or visual identification based on the real world (e.g., recognizing faces, animals, objects, places, natural elements, barcodes), communication (e.g., sharing the user's point of view, visual experience sharing), performing visual translation (e.g., realtime translation of signs, newspapers, or other written documents), and augmenting reality visually by placing or blocking visual elements in the real world (e.g., a navigation overlay on a road, blocking advertising, animated character overlaid on a setting, motion detecting/tracking, heat and/or surface reading). Still other visual type functions may be provided. After the various visual type functions are on, further selections as to which function is to be used may be made by a user.

Figure 3B:
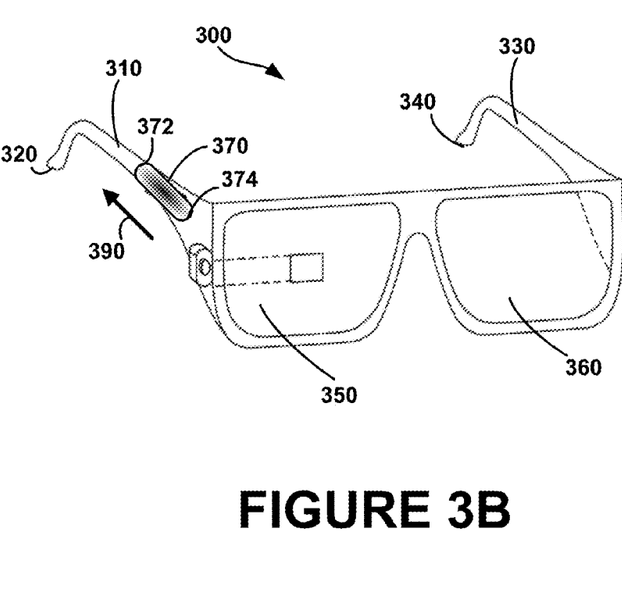
FIG. 3B illustrates a direction of movement for triggering audio functions on the wearable computing system of FIG. 3A.

FIG. 3B illustrates a gesture that may be input for triggering audio functions on the HMD 300 of FIG. 3A. The direction of the gesture shown in FIG. 3B is a rearward gesture, shown by arrow 390, that may begin with an applied pressure input near the second end 374 of the touch pad 370 and may comprise a swipe in the direction toward the first end 372 of the touch pad 370. Thus, the rearward gesture 390 may comprise a motion on the touch pad 370 that begins near the wearer's eye and moves toward the wearer's ear when the HMD 300 is worn.

The HMD 300 may receive an indication that the rearward gesture 390 has been input on the touch pad 370. In response to receiving the indication of the rearward gesture 390, the HMD 300 may be configured to execute instructions to activate certain functions of the HMD 300, for example, audio type functions. Examples of audio type functions are recording and reviewing to audio (e.g., music, voice messages), performing a speech search, input of system commands, communication (e.g., speaking a message, audio experience sharing), performing audio translation, and augmenting reality audio by adding or enhancing real world video (e.g., hearing distant sounds, adding environmental sounds to the real world, navigating audio instructions). Still other audio type functions may be provided. After the various audio-type functions are on, further selections as to which function is to be used may be made by a user.

In one example embodiment, the HMD 300 may only receive one of the gestures of the forward gesture 380 and the rearward gesture 390 to trigger a type of function. That is, the HMD 300 does not require two gesture types (such as the forward gesture 380 and the rearward gesture 390) to trigger a type of function. The HMD 300 may be designed such that only a forward gesture triggers a type of function (such as visual functions). In another example embodiment, the HMD 300 may be designed such that only a rearward gesture triggers a type of function (such as audio functions).

In another example embodiment, no touch pad may be present on the HMD 300; instead, a sensor may be positioned so as to capture any graphical movement near the extendable side-arm 310. In this example embodiment, the gesture need not touch the HMD 300 to be detected by the sensor. The sensor may comprise a number of types of sensors, and may be the same as or similar to the sensor 122 as described with reference to FIG. 1A. One or more sensors may be used to detect a gesture near the HMD 300.

In another example embodiment, different gestures may be used in place of forward and rearward gestures, and different functions may be triggered by the gestures. An initial gesture may be used to trigger one type of function, and a second gesture may be used to trigger another type of function, where the second gesture moves in a direction opposite from the initial gesture. For example, an upward gesture may be input to trigger one type of function, and a downward gesture may be input to trigger another type of function. Generally, the gestures used to trigger the different function types may be opposite gestures. The forward and rearward gestures described with reference to FIGS. 3A-B are examples of such gestures that may be considered to be opposites as they move in opposite directions. Other gestures may also be envisioned. The gestures may trigger various types of functions aside from the visual and audio functions discussed with reference to FIGS. 3A-B in other example embodiments.

IV. Example Methods

Figure 4:
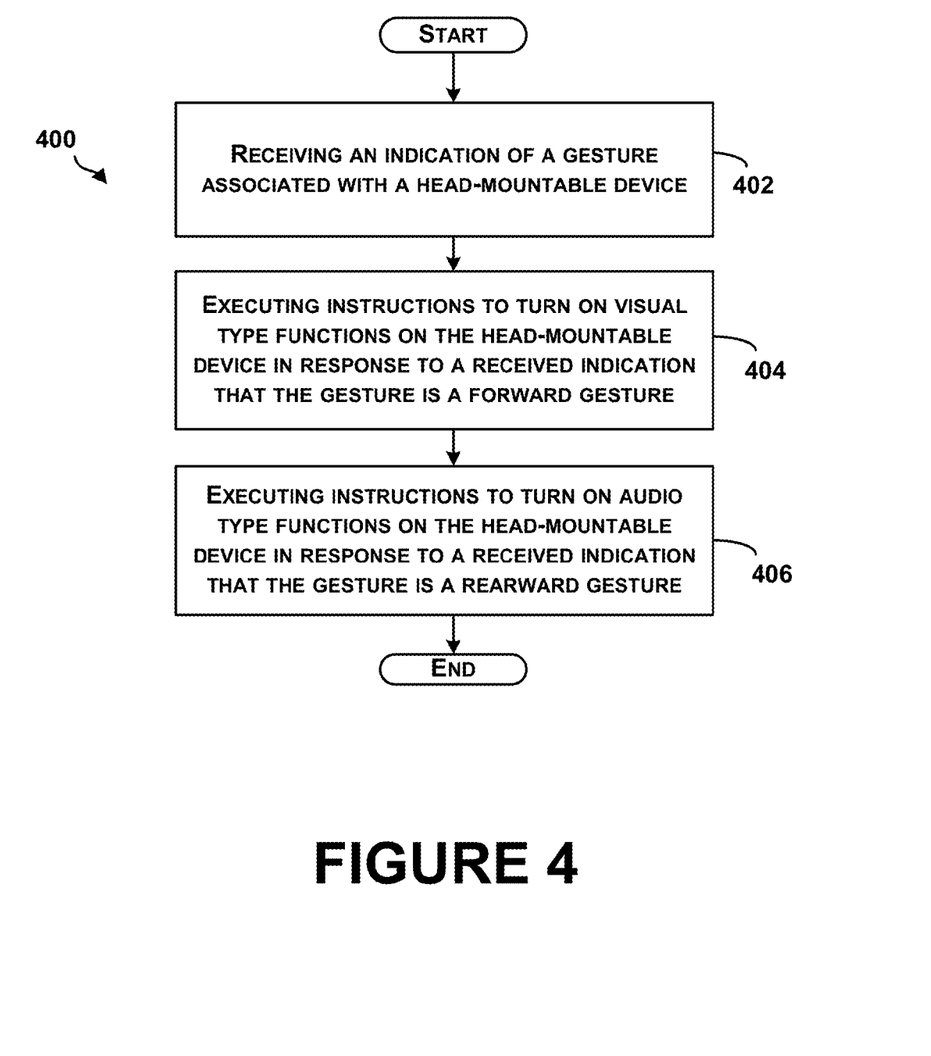
FIG. 4 shows a flowchart depicting an example method 400 for triggering functions on a wearable computing system, in accordance with an embodiment.

FIG. 4 shows a flowchart depicting an example method 400 for triggering functions, in accordance with an embodiment.

Method 400 shown in FIG. 4 presents an embodiment of a method that, for example, could be used with the systems and devices described herein. Method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, and compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block may represent circuitry that is wired to perform the specific logical functions in the process.

As shown, the method 400 begins at block 402 where a head-mountable device receives an indication of a gesture associated with the head-mountable device. The head-mountable device may take any of the forms described above in connection with FIGS. 1A-3B. In some embodiments, the head-mountable device may include a heads-up display. Other wearable computing devices are possible as well.

The gesture may be a graphical motion that is detected and/or received via a touch pad on the head-mountable device, such as the touch pads 124, 370 described with reference to FIGS. 1A and 3A-3B. As used herein, a "graphical motion" may comprise an input on the touch pad, such as by a user's finger or a stylus. The graphical motion may comprise one or more of touches, swipes, and/or taps on the touch pad that may be entered at varying pressures, speed, position, and points of contact.

The method further includes at block 404 executing instructions to activate visual type functions on the head-mountable device in response to a received indication that the gesture is a forward gesture. The forward gesture may be a graphical motion comprising a swipe in a direction toward an eyepiece or a lens element of the head-mountable device. More specifically, a touch pad may include a first end and a second end, where the first end is located toward an end of a side-arm of the head-mountable device and the second end is located toward a lens element on the head-mountable device. The forward gesture may comprise an applied pressure on the touch pad that moves in a direction toward the second end of the touch pad. The direction of the forward gesture may be such as described in connection with FIGS. 3A-3B.

The visual type functions may comprise a category of functions that relate to vision or sight, and may include recording or reviewing photographs, bursts, panoramas, cliplets, or videos, performing a visual search or visual identification based on the real world (e.g., recognizing faces, animals, objects, places, natural elements, barcodes), communication (e.g., sharing the user's point of view, visual experience sharing), performing visual translation (e.g., real-time translation of signs, newspapers, or other written documents), and augmenting reality visually by placing or blocking visual elements in the real world (e.g., a navigation overlay on a road, blocking advertising, animated character overlaid on a setting, motion detecting/tracking, heat and/or surface reading). Still other visual type functions may be provided. The forward gesture on the touch pad comprising a swipe motion toward the lens element of the head-mountable device may be an intuitive movement for a wearer to perform when the wearer wants to trigger visual type functions, as the movement is made toward the wearer's eye.

The method then includes at block 406 executing instructions to activate audio type functions on the head-mountable device in response to a received indication that the gesture is a rearward gesture. The rearward gesture may comprise a movement on the touch pad that is in a direction toward the first end of the touch pad, that is, toward the end of the extending side-arm of the wearable computing device. When a rearward gesture is detected, instructions are executed by the processor of the wearable computing device to perform functions that include activating audio functions, for example.

The audio type functions may comprise a category of functions that relate to sound or hearing, and may include recording and reviewing to audio (e.g., music, voice messages), performing a speech search, input of system commands, communication (e.g., speaking a message, audio experience sharing), performing audio translation, and augmenting reality audio by adding or enhancing real world video (e.g., hearing distant sounds, adding environmental sounds to the real world, navigating audio instructions). Still other audio type functions may be provided. The rearward swipe on the touch pad may be a movement toward the wearer's ear when the wearable computing device worn by a wearer. The rearward gesture on the touch pad comprising a swipe motion toward the end of an extending side-arm of the wearable computing device may be an intuitive movement for a wearer to perform when the wearer wants to trigger audio type functions, as the movement is made toward the wearer's ear.

Another gesture, such as a tap or other graphical motion or series of motions, may additionally be used on the touch pad to activate or to unlock the head-mountable device. In one example embodiment, the head-mountable device may be in a sleep mode or may be in a locked mode. When the gesture is input to activate the head-mountable device, content from memory and/or a mode of operation may be shown. In one example embodiment, the gesture used to turn the head-mountable device on may be a tap on the touch pad. In one example embodiment, in a sleep mode visual functions such as a display or screen on the head-mountable device and audio functions such as a microphone may not be turned on. After the head-mountable device is turned on, the graphical gestures to trigger types of functions such as visual or audio functions as described above with reference to blocks 402-406 may be used.

In an alternative embodiment, the graphical motions recited in blocks 402-406 may be performed without a touch pad or any physical contact with the head-mountable device, and may instead be performed in the air within a detection range of a sensor on or associated with the head-mountable device. Thus a wearer of the device need not physically touch the device to activate the triggers.

Figure 5A:
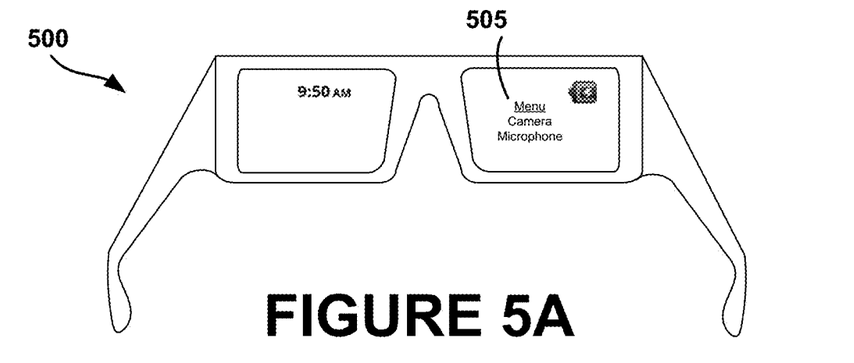
FIG. 5A illustrates a schematic drawing of a computing device.

FIG. 5A illustrates a schematic drawing of a computing device 500 showing a home screen. The computing device 500 may be a heads-up display system, such as the head-mountable devices 102, 152, or 172 described with reference to FIGS. 1A-1D.

In the example embodiment shown in FIG. 5A, the home screen of the computing device is in an active state. A menu 505 appears on the home screen with options for selection by a user. In another example embodiment, however, the home screen may be in a state such as a sleep state, an off state, a locked state, or other such state where the screen is inactive. In yet another embodiment, the home screen may be in an active state and may display various items such as the time and/or the status of the device, but may not have a menu available with options ready for selection. Still other states of the home screen may be envisioned.

Figure 5B:
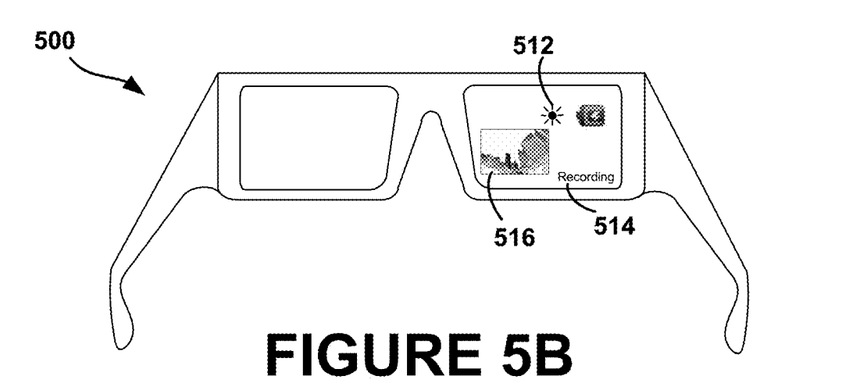
FIG. 5B illustrates a schematic drawing of the computing device of FIG. 5A with example activated visual functions.

FIG. 5B illustrates a schematic drawing of the computing device of FIG. 5A with example activated visual functions. As described with reference to the method 400, a gesture may be input to the computing device 500, and in response to a received indication that the gesture is a forward gesture, the computing device may execute instructions to activate visual type functions on the computing device. The forward gesture may be a graphical motion comprising a swipe in a direction toward an eyepiece or a lens element of the head-mountable device. An example visual type function that may be activated is shown in FIG. 5B, where a camera 510 has been activated to record a video. A flashing light 512 and/or a notification 514 may appear to notify the user that a recording is taking place. A still image capture 516 may appear on the home screen as the user captures the image.

In the example embodiment where the home screen is in an inactive state or an active state but without a selection menu, as described above with reference to FIG. 5A, the forward gesture such as described above may be input and the gesture may trigger activation of the home screen and specifically a type of function as described with reference to the method 400 on the home screen.

Figure 5C:
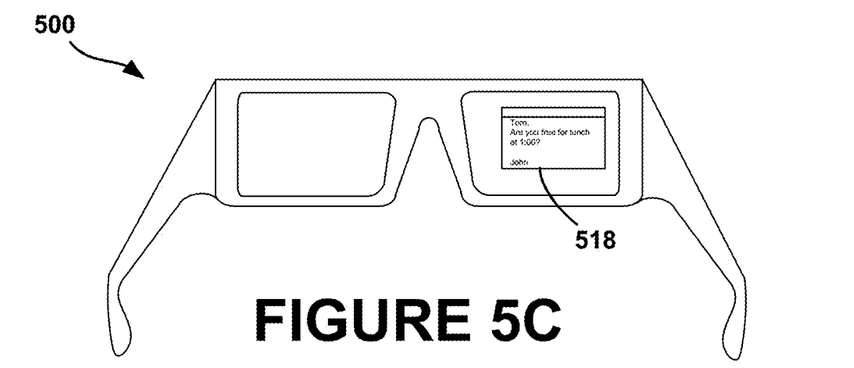
FIG. 5C illustrates a schematic drawing of the computing device of FIG. 5A with example activated audio functions.

FIG. 5C illustrates a schematic drawing of the computing device of FIG. 5A with example activated audio functions. As described with reference to the method 400, a gesture may be input to the computing device 500, and in response to a received indication that the gesture is a rearward gesture, the computing device may execute instructions to activate audio type functions on the computing device. The rearward gesture may be a graphical motion comprising a swipe in a direction toward an end of an earpiece of the head-mountable device. An example audio type function that may be activated is shown in FIG. 5C, where an email message 518 is displayed and the computing system may be reading back the email message to a user. Other examples of messages that may be read aloud by the computing system are a text message or a navigation instruction.

In the example embodiment where the home screen is in an inactive state or an active state but without a selection menu, as described above with reference to FIG. 5A, a gesture such as described in connection with the method 400 may be input and the gesture may trigger activation of the home screen and specifically a type of function as described with reference to the method 400 on the home screen.

V. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method comprising:
   receiving an indication of a gesture associated with a head-mountable device (HMD);
   executing instructions to activate a plurality of visual type functions on the HMD for selection in response to a received indication that the gesture is a forward gesture; and
   executing instructions to activate a plurality of audio type functions on the HMD for selection in response to a received indication that the gesture is a rearward gesture.

2. The method of claim 1, wherein the forward gesture comprises a swipe movement toward a lens element on the HMD.

3. The method of claim 1, wherein the rearward gesture comprises a swipe movement toward an end of a side-arm on the HMD.

4. The method of claim 1, wherein receiving the indication of the gesture further comprises receiving the indication via a touch pad.

5. The method of claim 1, wherein receiving the indication of the gesture further comprises receiving the indication via a sensor.

6. The method of claim 1, wherein the plurality of visual type functions comprise at least one of recording visual items, providing for the review of visual items, providing for a visual search, providing for visual communication, performing visual translation, and augmenting reality visually.

7. The method of claim 1, wherein the plurality of audio type functions comprise at least one of performing an audio recording, providing for the review of an audio recording, performing a speech search, providing for an input of system commands, providing for audio communication, and augmenting reality sonically.

8. The method of claim 1, further comprising:
   receiving an indication of a second gesture associated with the HMD; and
   activating a display on the HMD in response to receiving the indication of the second gesture.

9. The method of claim 8, wherein receiving the indication of the second gesture further comprises receiving an indication of a tap on a touch pad of the HMD.

10. The method of claim 8, wherein receiving the indication of the second gesture further comprises receiving an indication of a movement detected by a sensor associated with the HMD.

11. An article of manufacture including non-transitory tangible computer-readable media having computer-readable instructions encoded thereon, the instructions comprising:
    receiving an indication of a gesture associated with a head-mountable device (HMD);
    activating a plurality of visual type functions on the HMD for selection in response to an indication that the gesture is a forward gesture toward an eyepiece on the HMD; and
    activating a plurality of audio type functions on the HMD for selection in response to an indication that the gesture is a rearward gesture toward an end of an arm on the HMD.

12. The article of manufacture of claim 11, wherein the article of manufacture includes a heads-up display.

13. The article of manufacture of claim 11, wherein the instructions are further executable to perform functions comprising receiving an indication of a second gesture associated with the HMD, and activating the HMD in response to receiving the indication of the second gesture.

14. The article of manufacture of claim 11, wherein the instructions are further executable to perform functions comprising receiving the indication of the gesture via a touch pad.

15. The article of manufacture of claim 11, wherein the instructions are further executable to perform functions comprising receiving the indication of the gesture via a sensor.

16. A system comprising:
   a processor;
   a head-mountable device (HMD) comprising a heads-up display;
   data storage; and
   non-transitory machine language instructions stored on the data storage executable by the processor to perform functions including:
   receiving an indication of a gesture associated with the HMD;
   activating a plurality of visual type functions on the HMD for selection in response to an indication that the gesture is a gesture toward an eyepiece on the HMD; and
   activating a plurality of audio type functions on the HMD for selection in response to an indication that the gesture is a gesture toward an end of an arm on the HMD.

17. The system of claim 16 wherein the instructions are further executable to perform functions comprising receiving an indication of a second gesture associated with the HMD, and activating the HMD in response to receiving the indication of the second gesture.

18. The system of claim 16 wherein the instructions are further executable to perform functions comprising receiving the indication via a touch pad.

19. The system of claim 16 wherein the instructions are further executable to perform functions comprising receiving the indication via a sensor.

20. The system of claim 16, wherein the visual type functions comprise at least one of recording visual items, providing for the review of visual items, providing for a visual search, providing for visual communication, performing visual translation, and augmenting reality visually.

21. The system of claim 16, wherein the audio type functions comprise at least one of performing an audio recording, providing for the review of an audio recording, performing a speech search, providing for an input of system commands, providing for audio communication, and augmenting reality sonically.

22. A system comprising:
   a processor;
   a head-mountable device (HMD) comprising a heads-up display;
   data storage; and
   non-transitory machine language instructions stored on the data storage executable by the processor to perform functions including:
   receiving an indication of a gesture associated with the HMD;
   activating visual type functions for selection on the HMD in response to an indication that the gesture is a gesture toward an eyepiece on the HMD; and
   activating audio type functions for selection on the HMD in response to an indication that the gesture is a gesture toward an end of an arm on the HMD.

\* \* \* \* \*